United States Patent
Patel

[11] Patent Number: 5,860,107
[45] Date of Patent: Jan. 12, 1999

[54] PROCESSOR AND METHOD FOR STORE GATHERING THROUGH MERGED STORE OPERATIONS

[75] Inventor: Rajesh Bhikhubhai Patel, Austin, Tex.

[73] Assignees: International Business Machines Corporation, Armonk, N.Y.; Motorola, Inc., Schaumburg, Ill.

[21] Appl. No.: 726,736

[22] Filed: Oct. 7, 1996

[51] Int. Cl.$^6$ .................................................. G06F 12/08
[52] U.S. Cl. .......................................... 711/140; 711/220
[58] Field of Search .................................... 711/113, 118, 711/126, 140, 169, 201, 220, 138, 142, 143, 170, 171, 172, 173; 707/101; 395/859, 874

[56] References Cited

U.S. PATENT DOCUMENTS

| | | | |
|---|---|---|---|
| 4,538,226 | 8/1985 | Hori | 711/3 |
| 4,805,098 | 2/1989 | Mills, Jr. et al. | 711/118 |
| 5,046,000 | 9/1991 | Hsu | 711/100 |
| 5,357,622 | 10/1994 | Parks et al. | 711/117 |
| 5,471,598 | 11/1995 | Quattromani et al. | 711/122 |
| 5,550,774 | 8/1996 | Brauer et al. | 365/189.02 |
| 5,581,734 | 12/1996 | DiBrino et al. | 711/169 |
| 5,644,752 | 7/1997 | Cohen et al. | 711/122 |

*Primary Examiner*—Eddie P. Chan
*Assistant Examiner*—Hiep T. Nguyen
*Attorney, Agent, or Firm*—Mark E. McBurney; Brian F. Russell; Andrew J. Dillon

[57] ABSTRACT

First and second store instructions that target one or more locations in a cache memory are identified. A determination is made whether the cache memory is busy. In response to a determination that the cache memory is busy, the operations specified by the first and second store instructions are merged into a single store operation that subsumes store operations specified by the first and second store instructions. Thereafter, the single store operation is performed.

25 Claims, 7 Drawing Sheets

Fig. 4B

| | V_A V_D | Address / Data Source | Data | Data Size | BE |
|---|---|---|---|---|---|
| Finished store Q | 1  1 | st 0x12345660 GPR04 | BBBBBBBBxxxxxxxx | 4 | 0xF0 |
| Completed store Q0 | 1  1 | st 0x12345664 GPR31 | xxxxxxxxAAAAAAAA | 4 | 0x0F |
| Completed store Q1 | | | | | |

Fig. 4C

| | V_A V_D | Address / Data Source | Data | Data Size | BE |
|---|---|---|---|---|---|
| Finished store Q | 0  0 | | | | |
| Completed store Q0 | 1  1 | st 0x12345660 GPR31/ GPR04 | BBBBBBBBAAAAAAAA | 8 | 0xFF |
| Completed store Q1 | | | | | |

PROCESSOR AND METHOD FOR STORE GATHERING THROUGH MERGED STORE OPERATIONS

BACKGROUND

1. Technical Field

The technical field of the present specification relates in general to a method and system for data processing and in particular to a processor and method for storing data to a memory within a data processing system. Still more particularly, the technical field relates to a processor and method for store gathering through merging store instructions.

2. Description of the Related Art

A typical state-of-the-art processor comprises multiple execution units, which are each optimized to execute a corresponding type of instruction. Thus, for example, a processor may contain a fixed-point unit (FXU), a floating-point unit (FPU), a branch processing unit (BPU), and a load-store unit (LSU) for executing fixed-point, floating-point, branch, and load and store instructions, respectively.

When a store instruction is retrieved from memory for execution by a processor, the instruction is first decoded to determine the execution unit to which the instruction should be dispatched. After the store instruction is decoded, the store instruction is dispatched to the LSU for execution. Execution of a store instruction entails calculating the effective address (EA) of the memory location to which the data associated with the store instruction is to be written. After a store instruction has finished, that is, the EA of the store instruction has been calculated, the store instruction is completed by committing the data associated with the store instruction to a store queue from which the data will be written to the specified memory location.

In order to reduce the number of cycles required to store and retrieve data, processors are often equipped with an on-board upper level data cache. Such upper level data caches permit data accesses to be performed in as little as a single cycle. Because of the minimal data latency associated with data accesses to cached data, only a small performance inefficiency results from multiple consecutive stores to the same doubleword in memory. However, in data processing system configurations without caches or in which store instructions are cache-inhibited or write-through, performance inefficiency arises from multiple consecutive stores to the same doubleword due to the additional latency of bus accesses.

Consequently, it would be desirable to provide an efficient method and system for storing data to memory within a data processing system which minimize the number of cycles required to perform multiple store accesses to the same doubleword.

SUMMARY

It is therefore one object of the present disclosure to provide a method and system for data processing.

It is another object of the present disclosure to provide an improved processor and method for storing data to a memory within a data processing system.

It is yet another object of the present disclosure to provide a processor and method for store gathering through merging store instructions.

The foregoing objects are achieved as is now described. First and second store instructions that target one or more locations in a cache memory are identified. A determination is made whether the cache memory is busy. In response to a determination that the cache memory is busy, the operations specified by the first and second store instructions are merged into a single store operation that subsumes store operations specified by the first and second store instructions. Thereafter, the single store operation is performed.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A–4C depict store gathering within the store queue of the load-store unit (LSU) depicted in FIG. 2.

DETAILED DESCRIPTION

Figure 1:
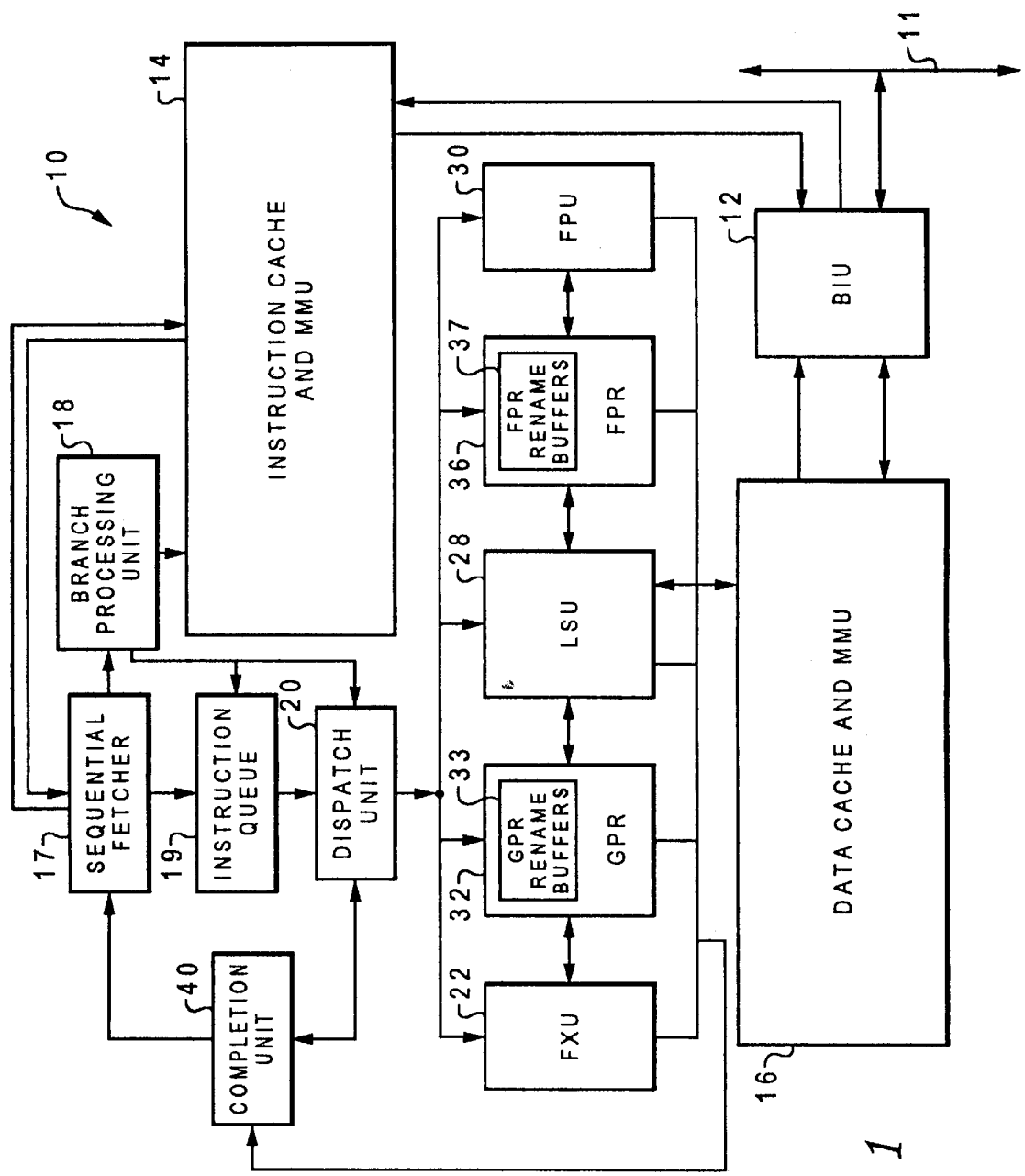
FIG. 1 is an illustrative embodiment of a processor which utilizes store gathering to enhance the performance of store accesses to memory.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated), by participating in bus arbitration. Processor 10, system bus 11, and the other devices coupled to system bus 11 together form a host data processing system.

BIU 12 is connected to instruction cache and MMU (Memory Management Unit) 14 and data cache and MMU 16 within processor 10. High-speed caches, such as those within instruction cache and MMU 14 and data cache and MMU 16, enable processor 10 to achieve relatively fast access time to a subset of data or instructions previously transferred from main memory to the caches, thus improving the speed of operation of the host data processing system. Instruction cache and MMU 14 is further coupled to sequential fetcher 17, which fetches instructions for execution from instruction cache and MMU 14 during each cycle. Sequential fetcher 17 transmits branch instructions fetched from instruction cache and MMU 14 to branch processing unit (BPU) 18 for execution, but temporarily stores sequential instructions within instruction queue 19 for execution by other execution circuitry within processor 10.

In the depicted illustrative embodiment, in addition to BPU 18, the execution circuitry of processor 10 comprises multiple execution units for executing sequential instructions, including fixed-point unit (FXU) 22, load-store unit (LSU) 28, and floating-point unit (FPU) 30. Each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either the data cache within data cache and MMU 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of highperformance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache and MMU 14. Sequential instructions fetched from instruction cache and MMU 14 are stored by sequential fetcher 17 within instruction queue 19. In contrast, sequential fetcher 17 removes (folds out) branch instructions from the instruction stream and forwards them to BPU 18 for execution. BPU 18 includes a branch prediction mechanism, which in one embodiment comprises a dynamic prediction mechanism such as a branch history table, that enables BPU 18 to speculatively execute unresolved conditional branch instructions by predicting whether or not the branch will be taken.

During the decode/dispatch stage, dispatch unit 20 decodes and dispatches one or more instructions from instruction queue 19 to execution units 22, 28, and 30, typically in program order. In addition, dispatch unit 20 allocates a rename buffer within GPR rename buffers 33 or FPR rename buffers 37 for each dispatched instruction's result data. Upon dispatch, instructions are also stored within the multiple-slot completion buffer of completion unit 40 to await completion. According to the depicted illustrative embodiment, processor 10 tracks the program order of the dispatched instructions during out-of-order execution utilizing unique instruction identifiers.

During the execute stage, execution units 22, 28, and 30 execute instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results, if any, within either GPR rename buffers 33 or FPR rename buffers 37, depending upon the instruction type. Then, execution units 22, 28, and 30 notify completion unit 40 which instructions have finished execution. Finally, instructions are completed in program order out of the completion buffer of completion unit 40. Instructions executed by FXU 22 and FPU 30 are completed by transferring data results of the instructions from GPR rename buffers 33 and FPR rename buffers 37 to GPRs 32 and FPRs 36, respectively. Load and store instructions executed by LSU 28 are completed by transferring the finished instructions to a completed store queue or a completed load queue from which the load and store operations indicated by the instructions will be performed.

Figure 2:
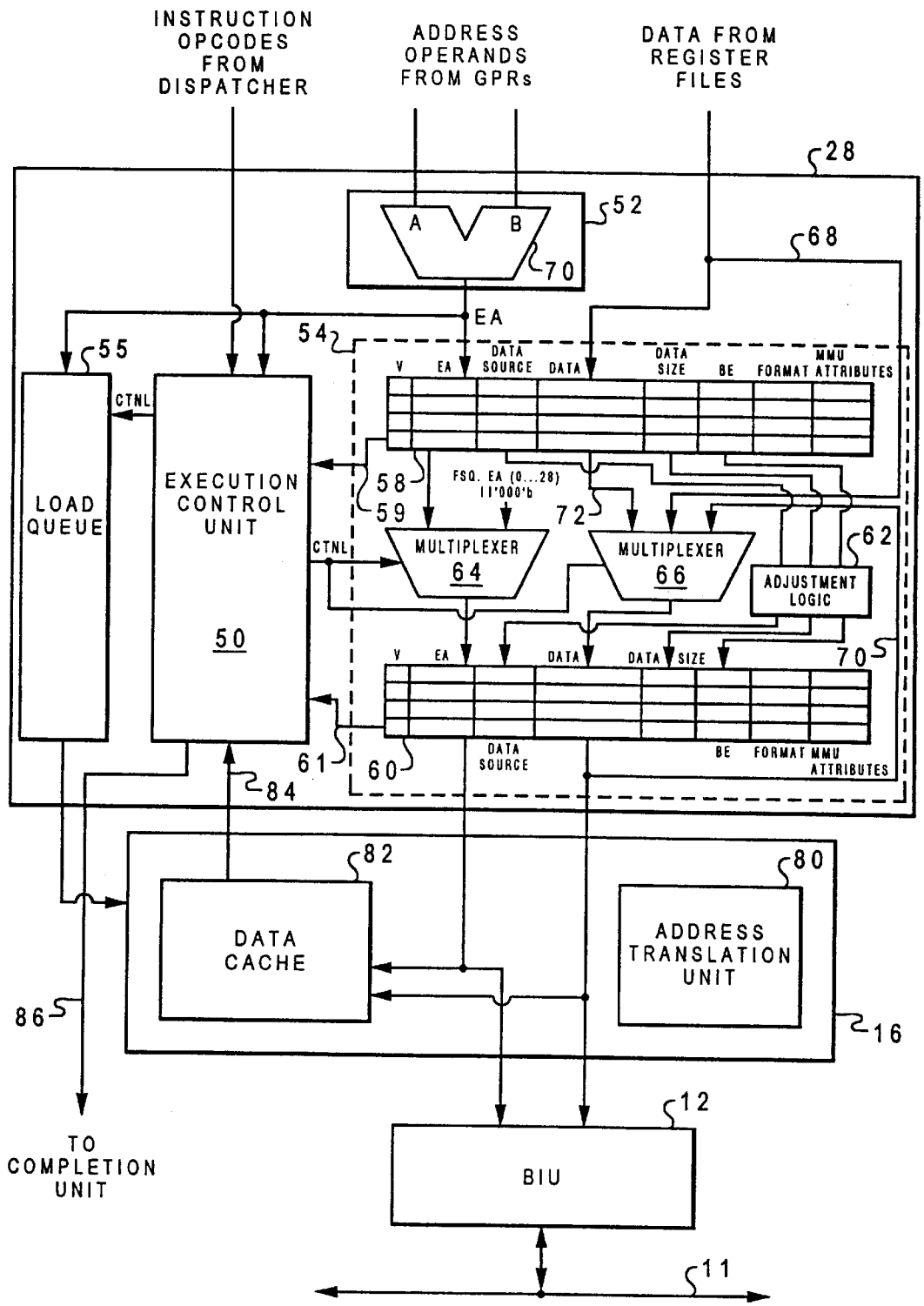
FIG. 2 depicts a more detailed block diagram representation of the load-store unit (LSU) of the processor illustrated in FIG. 1.

Referring now to FIG. 2, there is depicted a more detailed block diagram of the execution circuitry of load-store unit (LSU) 28 illustrated in FIG. 1. As depicted, LSU 28 includes execution control unit 50, which controls the execution of load and store instructions dispatched to LSU 28 by dispatch unit 20. Execution control unit 50 includes logic for decoding load and store instruction opcodes and for comparing store instruction addresses and attributes to determining whether to merge store instructions. LSU 28 further includes address calculation unit 52, which receives the 32-bit address operands associated with each load and store instruction. Utilizing adder 70, address calculation unit 52 sums the address operands to generate a 32-bit effective address (EA) for the associated instruction. LSU 28 also includes store queue 54 and load queue 55, which manage the EA, data, and additional instruction information associated with store and load instructions dispatched to LSU 28.

Store queue 54 is composed of finished store queue (FSQ) 58 and completed store queue (CSQ) 60, which each comprise a multiple-entry FIFO sub-queue, as well as additional circuitry such as adjustment logic 62 and multiplexers 64 and 66. As indicated, each entry within FSQ 58 and CSQ 60 has a 32-bit EA field that stores the EA generated by address calculation unit 52, a data source field that specifies which GPR(s) 32 or FPR(s) 36 store(s) the data associated with the store instruction, and a 64-bit data field that contains the data to be stored. The validity of the EA and data fields of each entry of FSQ 58 and CSQ 60 is individually indicated by the state of valid bits within a valid field. Each entry within FSQ 58 and CSQ 60 further includes several attribute fields, including a data size field that indicates the byte size of the data, a byte enable (BE) field that specifies which of the data bytes contain valid data, a format field that contains the format attributes associated with the data, and an MMU attribute field that indicates the MMU attributes of the data. In addition to being stored within the EA field of an entry of FSQ 58, the EA generated by address calculation unit 52 for each store instruction is also passed to execution control unit 50, which, as described in detail below, utilizes the EA to determine if the associated store instruction can be merged with another store instruction in order to enhance processor efficiency. As illustrated at reference numeral 59, execution control unit 50 is further coupled to FSQ 58 such that execution control unit 50 can read in the bottom entry of FSQ 58 for comparison of the EA and attributes of the store instruction in the bottom entry with those of another store instruction to determine if the two store instructions can be merged. While a store instruction is stored in FSQ 58, the EA of the store instruction is passed to address translation unit 80 of data cache and MMU 16 in order to translate the EA of the store instruction into a physical address and to determine if the store instruction generated an exception. The physical address bits (bits 0–20) returned to FSQ 58 by address translation unit 80 are stored into the EA field of the appropriate entry in FSQ 58.

Still referring to store queue 54, if a store instruction is present in the bottom entry of FSQ 58, the store instruction is considered for completion during each cycle. In one embodiment, a store instruction is completed only if the store instruction is the oldest instruction within processor 10, that is, if the store instruction is stored in the bottom completion buffer slot within completion unit 40; however, in other embodiments that allow speculative completion, store instructions in other completion buffer slots can be completed. Once a store instruction has been approved for completion, the EA and data of the store instruction are removed from the bottom entry of FSQ 58 and passed to multiplexers 64 and 66, respectively. In addition to the 32-bit EA of the store instruction, multiplexer 64 receives a second input comprised of the 29 high order bits of the store instruction's EA concatenated with '000'b, which are the three low order address bits of every 64-bit doubleword. Thus, under the control of execution control unit 50, multiplexer 64 selects either the EA passed from FSQ 58 or the EA of the 64-bit doubleword containing the memory location addressed by the specified EA. Thereafter, multiplexer 64 stores the selected EA in an entry within CSQ 60.

The inputs to multiplexer 66 include a bypass input 68, a feedback input 70, and a FSQ input 72, which provides data from the data field of the bottom entry of FSQ 58. Bypass input 68 permits store instruction data to bypass FSQ 58 when FSQ 58 is empty in order to avoid unnecessary LSU idle cycles. Feedback input 70, on the other hand, presents data stored in the 64-bit data field of the bottom entry of CSQ 60 for selection or possible combination with other data inputs of multiplexer 66. Based upon control signals received from execution control unit 50, multiplexer 66 selects data bits within one of FSQ input 72 or bypass input 68 and, if store instructions are to be merged, zero or more bits within feedback input 70. Following the selection and combination of data bits by multiplexer 66, the data bits are stored within the 64-bit data field of an entry within CSQ 60. The use of 64-bit data fields within FSQ 58 and CSQ 60 permits multiplexer 66 to merge both single and double-precision data, thereby minimizing the additional hardware required to implement store gathering. For example, each entry within FSQ 58 and CSQ 60 is able to store a single 64-bit double precision dataword. Furthermore, as described in detail below with reference to FIGS. 4A–4C, entries within CSQ 60 are capable of storing two different 32-bit single-precision datawords targeted to sequential addresses in data cache 82.

As illustrated, store queue 54 also includes adjustment logic 62, which appropriately modifies the data source, data size, and byte enable fields associated with a store instruction if the store instruction is merged with another store instruction. When a store instruction is transferred from FSQ 58 to CSQ 60, execution control unit 50 sends a finish message 86 to completion unit 40 to indicate which store instruction has finished. Completion unit 40 then removes the indicated store instruction from the completion buffer when the store instruction is stored within the bottom slot of the completion buffer.

Still referring to FIG. 2, CSQ 60 comprises a queue that stores completed store instructions for which the indicated store operations are yet to be performed. As illustrated at reference numeral 61, CSQ 60, like FSQ 58, is coupled to execution control unit 50 so that execution control unit 50 can read in the bottom entry of CSQ 60 for comparison of the EA and attributes of the store instruction in the bottom entry with those of a store instruction in FSQ 58 to determine if the two store instructions can be merged. CSQ 60 is further coupled to address translation unit 80 and data cache 82 within data cache and MMU 16. When a store operation is to be performed, for example, during a period of low bus utilization, the physical address within the EA field of the bottom entry of CSQ 60 is passed to data cache 82 in conjunction with the data stored in the bottom entry of CSQ 60, if the store is cacheable. A cache controller within data cache 82 then manages the storage of the data in data cache 82. If data associated with the physical address is not resident within data cache 82 or if the store is cache-inhibited, the physical address and data are passed to BIU 12, which stores the data to main memory via system bus 11. As illustrated, data cache 82 supplies a busy signal 84 to execution control unit 50 to indicate when data cache 82 is busy and is thus unable to support a single cycle data access.

Figure 3A:
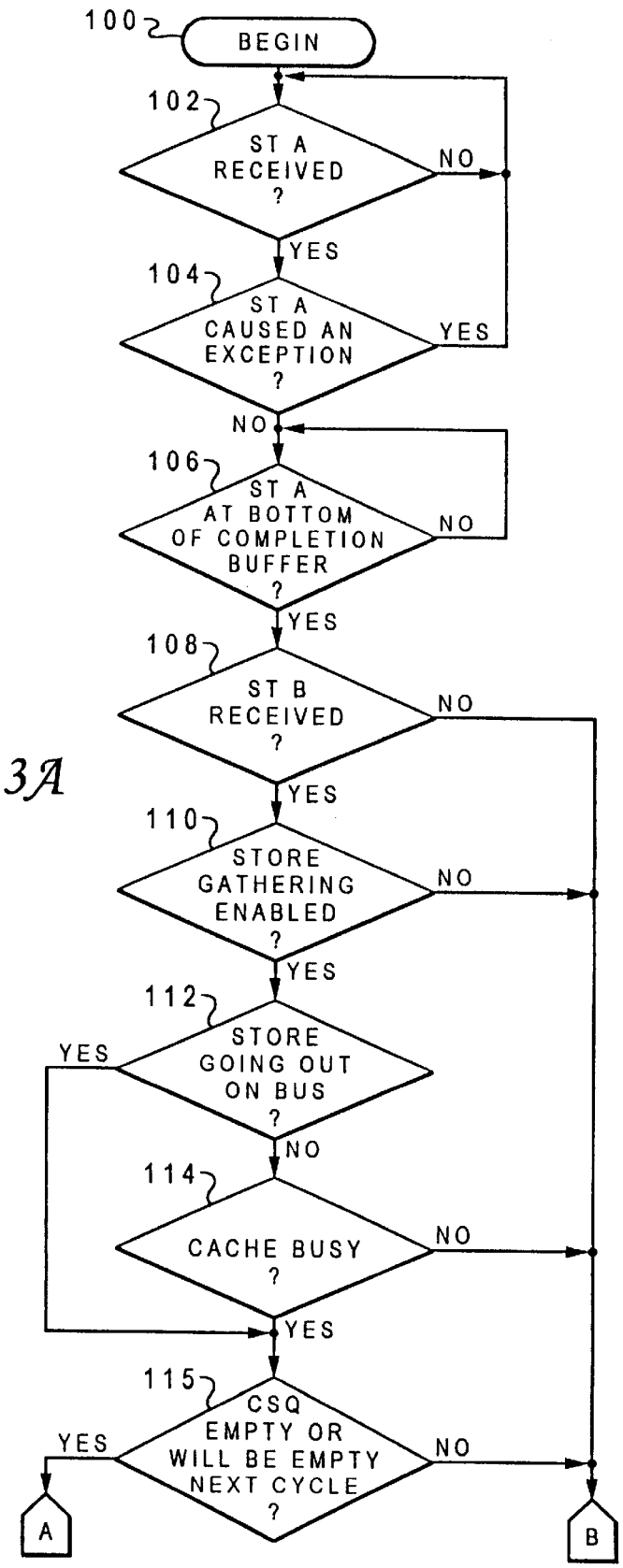
FIG. 3 is a flowchart illustrating a method of store gathering utilized by the processor illustrated in FIG. 1.
Figure 3B:
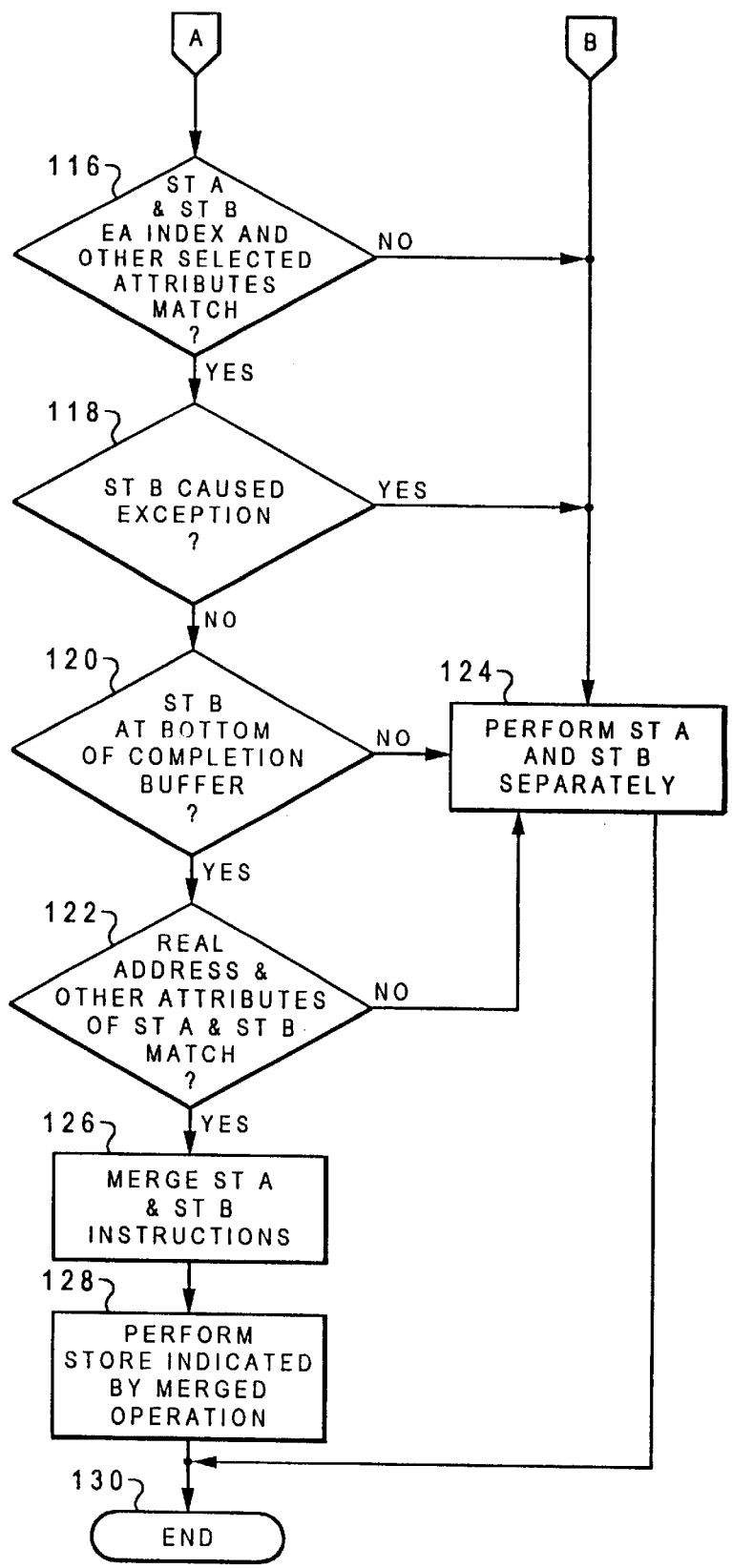

With reference now to FIGS. 3A and 3B, there are illustrated two logical flowcharts which together depict an illustrative embodiment of a method of store gathering in accordance with the illustrative embodiment of a processor shown in FIG. 1. Those skilled in the art will appreciate that although FIGS. 3A and 3B illustrate a logical sequence of steps within a method for merging store instructions, many of the illustrated steps are preferably performed in parallel. The method illustrated in FIGS. 3A and 3B will be described in the context of the exemplary store gathering operation depicted in FIGS. 4A–4C and the timing diagram illustrated in FIG. 5.

Figure 4A:
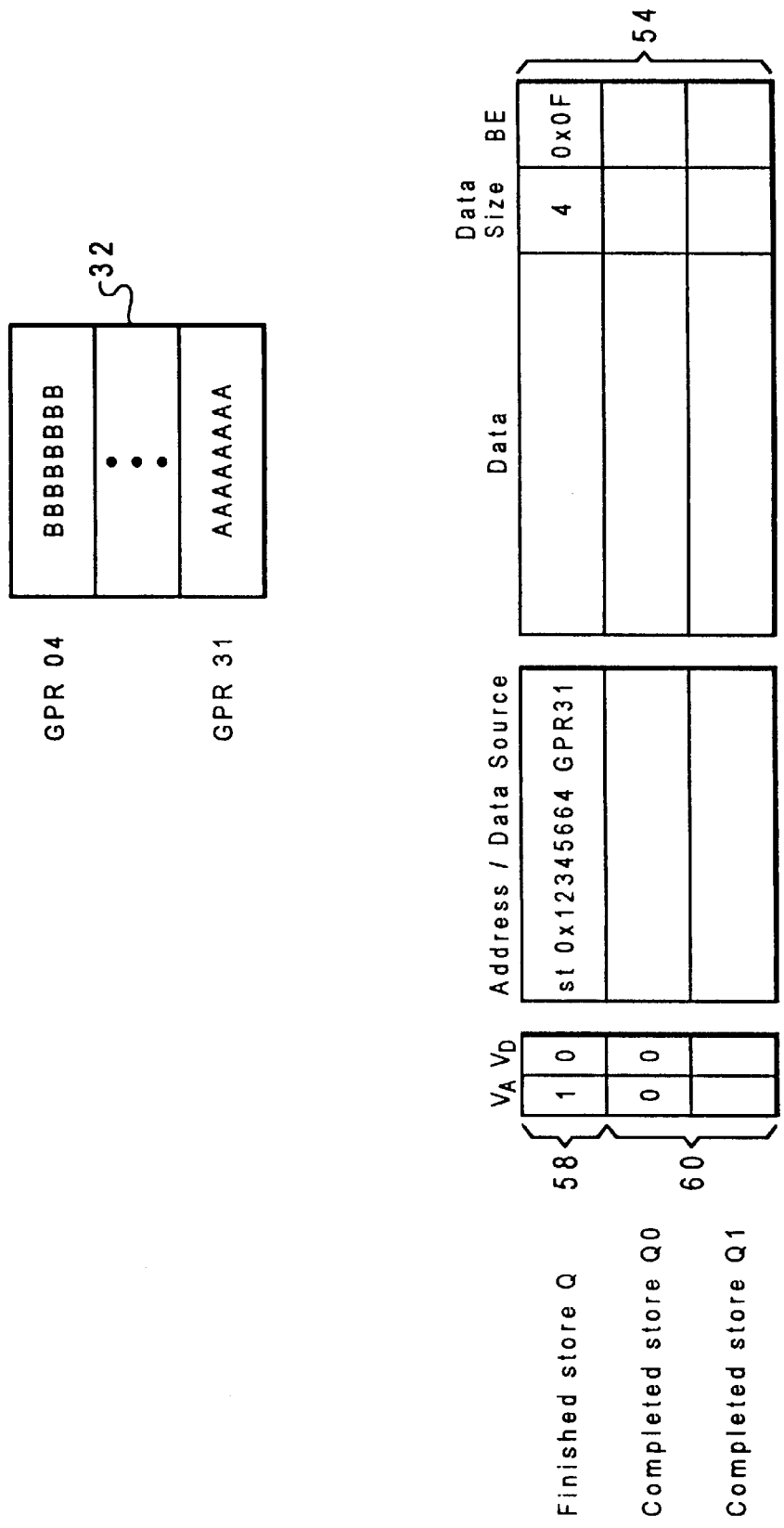
Figure 5:
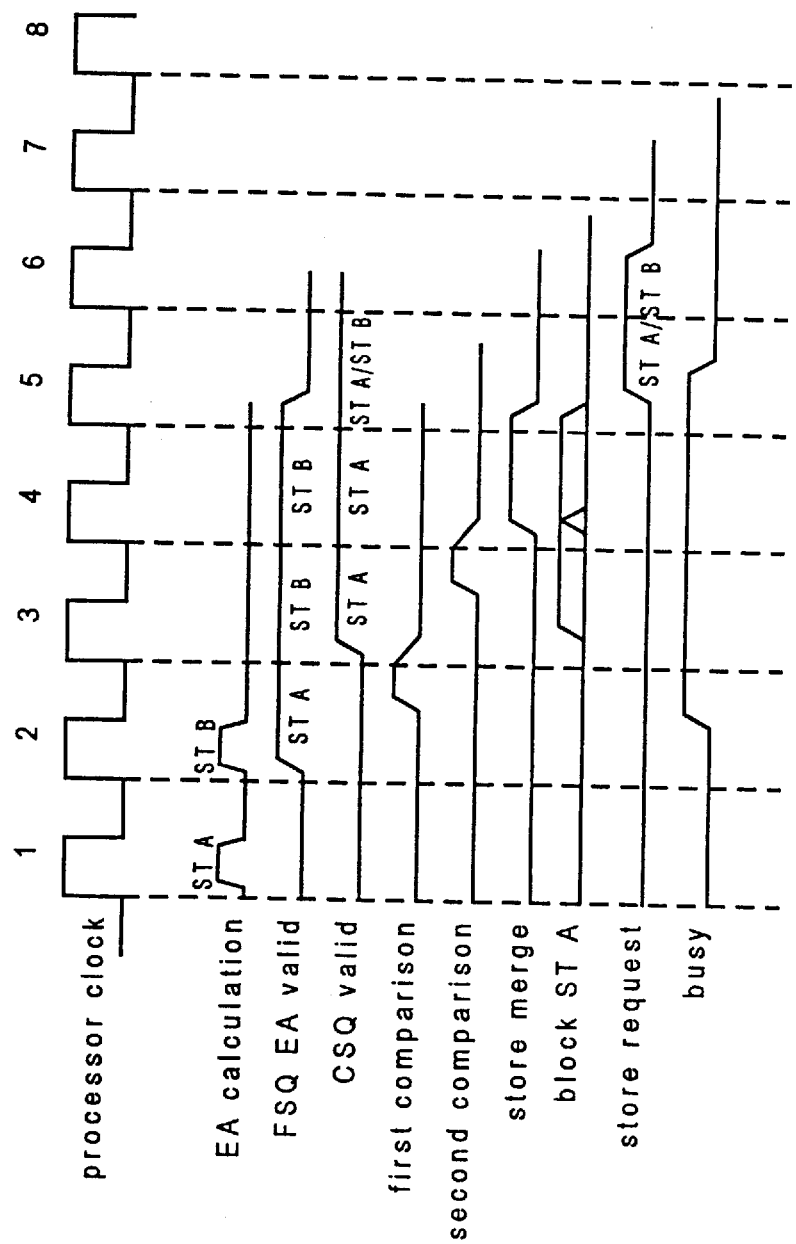
FIG. 5 is a timing diagram illustrating the timing of various events within a store gathering operation.

Referring first to FIG. 3A, the process begins at block 100 and thereafter proceeds to block 102, which illustrates execution control unit 50 determining whether or not a first store instruction (hereinafter ST A) has been received from dispatch unit 20 by LSU 28. If not, the process iterates at block 102 until ST A is received. With reference now to FIG. 5, if ST A is received by LSU 28 the EA of ST A is calculated by address calculation unit 52 in cycle 1. In addition, a store request is transmitted to data cache and MMU 16 to translate the EA into a physical address and to look up the EA for an exception. Following the calculation of the EA of ST A, the EA of ST A is valid within FSQ 58 at the beginning of cycle 2, as illustrated in FIGS. 4A and 5. As shown in FIG. 4A, the EA, size, and byte enable (BE) fields of the illustrated entry of FSQ 58 indicate that ST A is a 32-bit store that targets the least significant (rightmost) four bytes of an 8-byte doubleword. The data source field of the illustrated entry of FSQ 58 further specifies that the data associated with ST A is located in register 31 of GPRs 32. However, the data associated with ST A is not yet valid within FSQ 58 as indicated by valid bit $V_D$.

Returning to FIGS. 3A and 3B, following allocation of an entry within store queue 54 to ST A, execution control unit 50 then makes several determinations at blocks 104–116 during cycle 2 in order to ascertain whether or not ST A will be merged with a subsequent store instruction. Thus, at block 104, execution control unit 50 determines from the exception information returned by data cache and MMU 16 whether or not ST A caused an exception. If so, the process returns to block 102 to await another ST A instruction. However, if a determination is made at block 104 that ST A did not cause an exception, the process proceeds to block 106, which depicts a determination of whether or not ST A is in the bottom slot of the completion buffer within completion unit 40. As noted above, the determination made at block 106 reflects an illustrative embodiment of processor 10 that only completes store instructions that are the oldest instructions within processor 10; other embodiments of processor 10 may permit store instructions to be completed out of order. If a determination is made that ST A is not in the bottom slot of the completion buffer, the process iterates at block 106 unit such time as ST A is located at the bottom of the completion buffer. The process then proceeds from block 106 to block 108, which illustrates a determination of whether or not a subsequent store instruction, ST B, has been received by LSU 28 from dispatch unit 20. If not, the process passes to block 124 of FIG. 3B through page connector B. However, if ST B is received by LSU 28 during cycle 2, the EA of ST B is calculated in cycle 2 as depicted in FIG. 5.

Returning to FIG. 3A, the process proceeds from block 108 to block 110, which depicts a determination of whether or not store gathering is enabled. Store gathering can be enabled in processor 10 by default or through executing an instruction that sets a store gathering bit within an unillustrated control register of processor 10. If store gathering is not enabled, the process passes from block 110 to block 124 of FIG. 3B in the manner which has been described. However, if store gathering is enabled, the process proceeds from block 110 to block 112, which illustrates a determination of whether or not performing the store operation indicated by ST A entails writing data to main memory via system bus 11. The determination made at block 112 illustrates that merging store operations performed to main memory has an efficiency advantage in terms of data latency and bus utilization whether or not the store operation is cacheable. If ST A requires a store operation to main memory via system bus 11, for example, if ST A is a write-through store or is cache-inhibited, the process proceeds to block 115, which is described below. However, if the store operation indicated by ST A does not entail writing data to main memory, the process passes from block 112 to block 114.

Block 114 depicts a determination of whether or not data cache 82 will be busy during cycle 3 by testing the state of busy signal 84. If data cache 82 will not be busy, the process passes to block 124 through page connector B. Thus, for cacheable stores that will not be written to main memory via system bus 11, the depicted embodiment of execution control unit 50 makes the preliminary determination of whether ST A and ST B can be merged (illustrated at block 116) only if busy signal 84 indicates that data cache 82 will be busy during cycle 3. In cases in which data cache 82 is busy two or more consecutive cycles (as illustrated in FIG. 5), store gathering results in a performance advantage since multiple stores, which each ordinarily require at least one cycle, can be performed in a single cycle. The depicted method of store gathering has the further advantage of minimizing the power consumed by data cache 82 in cases where data cache 82 will be busy during cycle 3. Power is conserved since data cache 82 is enabled only for the merged cacheable store rather than for both ST A and ST B.

In order to significantly reduce power consumption by data cache 82, alternative embodiments of execution control unit 50 may omit the determination illustrated at block 114 and potentially merge cacheable stores even when data cache 82 is not busy since at most a single cycle data latency would result. For example, in low power implementations of processor 10, the minimal additional data latency incurred by merging multiple cacheable stores into a single store operation is frequently preferable to the power dissipation caused by enabling data cache 82 for each store individually. Referring again to block 114, if a determination is made that data cache 82 will be busy during cycle 3, the process passes to block 115, which illustrates a determination of whether of not CSQ 60 is empty or will be empty (except for ST A) during cycle 3. If not, the process passes to block 124 in the manner which has been described. However, if CSQ 60 is empty or will be empty (except for ST A) during cycle 3, the process proceeds through page connector A to block 116 of FIG. 3B.

Block 116 depicts a first comparison that compares the EA index bits (bits 21–28) and available data format attributes of ST A and ST B. The data format attributes of a store instruction include, for example, whether the data represents a fixed-point or floating-point value, the data size, whether the data is in big endian or little endian format, and whether the data represents graphics information. If the index bits of the EAs and the available data format attributes of ST A and ST B both match, execution control unit 50 blocks ST A until a final determination is made whether or not to merge ST A and ST B, as illustrated in FIG. 5. However, if the index bits of the EAs or the available data format attributes of ST A and ST B do not match, the process passes from block 116 to block 124, which illustrates LSU 28 performing the store operations indicated by ST A and ST B separately. Because the first comparison illustrated at block 116 is performed for cacheable stores not written to memory on system bus 11 only if data cache 82 is busy and therefore unable to immediately perform the store operation indicated by ST A, no performance penalty results from a mismatch of ST A and ST B at block 116.

Referring now to FIG. 4B, following the first comparison between ST A and ST B performed during cycle 2, the EA, data, and attributes of ST A are passed unmodified to CSQ 60. Thus, during cycle 3, ST A becomes valid in CSQ 60 and the EA of ST B becomes valid in FSQ 58. Also during cycle 3, execution control unit 50 determines if a second set of conditions for store gathering illustrated at blocks 118–122 of FIG. 3B are met. Referring now to blocks 118 and 120 of FIG. 3B, execution control unit 50 determines if ST B caused an exception and if ST B is in the bottom slot of the completion buffer in completion unit 40. If ST B caused an exception or if ST B is not in the bottom slot of the completion buffer, the process passes to block 124, which depicts LSU 28 performing ST A and ST B separately. However, if ST B did not cause an exception and is stored in the bottom slot of the completion buffer, the process passes to block 122, which depicts execution control unit 50 performing a second comparison of ST A and ST B to determine whether or not the real address bits (bits 0–19) of ST A and ST B match and if the MMU attributes of ST A and ST B match. In the illustrative embodiment, MMU attributes of ST A and ST B can include a write-through bit, a cache-inhibited bit, a memory coherency bit that enforces coherency for the addressed memory location, and a guarded bit that prevents speculative loading and prefetching from the addressed memory location. If the real address bits of ST A and ST B and the MMU attributes of ST A and ST B do not all match, the process passes from block 122 to block 124, which has been described. However, if the real address bits of ST A and ST B and the MMU attributes of ST A and ST B both match, the process passes from block 122 to block 126, which illustrates execution control unit 50 merging ST A and ST B during cycle 4, as depicted in FIG. 5. The illustrative embodiment of processor 10 performs the first and second comparisons independently during cycles 2 and 3, respectively, because the real address bits of ST B are not available during cycle 2. As noted above, performing the first partial comparison during cycle 2 enables processor 10 to avoid a performance penalty resulting from a mismatch between ST A and ST B in cases in which data cache 82 is busy. In other embodiments, however, a single comparison of ST A and ST B can be performed.

To merge ST A and ST B as illustrated at block 126 of FIG. 3B, execution control unit 50 asserts one or more control signals to cause multiplexer 64 to select the input which specifies a doubleword EA. The doubleword EA is then written into the address field of the bottom entry of CSQ 60 in place of the EA of ST A. In addition, execution control unit 50 asserts one or more control signals to cause multiplexer 66 to merge the data presented by feedback input 70 (ST A data) and FSQ input 72 (ST B data) and store the resulting merged data in the data field of the bottom entry of CSQ 60.

Referring now to FIGS. 4B and 4C, the contents of FSQ 58 and CSQ 60 are depicted during cycles 3 and 5, respectively, thereby illustrating the merger of ST A and ST B. As illustrated in FIG. 4B, FSQ 58 contains a 32-bit EA of ST B, which specifies an address location on a doubleword boundary. As is further illustrated, the data associated with ST B is contained within register 4 of GPRs 32, is 4 bytes long, and will be written to memory on the 4 high order bytes of the 8 byte data bus. ST A is contained within entry 0 of CSQ 60 and has an EA within the same doubleword as the EA of ST B. The data associated with ST A is contained within register 31 of GPRs 32, is 4 bytes in length, and will be written to memory on the 4 low order bytes of the bus.

Following the merger of ST A and ST B in cycle 4, entry 0 of CSQ 60 appears as depicted in FIG. 4C. As illustrated, the EA of the merged store instruction is the same as that of ST B because both ST A and ST B are targeted to memory locations within the doubleword specified by the ST B EA. As is further illustrated in FIG. 4C, the data associated with ST A and ST B has been merged so that the addressed doubleword of memory will hold the same data following the performance of the store operation indicated by the merged store instruction as it would have if the store operations indicated by ST A and ST B were performed in program order. In addition, the data source, data size, and byte enable fields of entry 0 of CSQ 60 have been adjusted by adjustment logic 62 to reflect that the data associated with the merged store instruction is contained in registers 4 and 31 of GPRs 32, is 8 bytes in length, and will be written to memory utilizing all 8 bytes of the data bus. The data source field within entry 0 of CSQ 60 is also modified by adjustment logic 62 to indicate the data sources for both ST A and ST B. Although FIGS. 4A–4C illustrate an example of store gathering in which the memory addresses written to by the merged store instructions do not overlap, those skilled in the art will recognize from the description provided herein that the illustrative embodiment of LSU 28 depicted in FIG. 2 can also merge store instructions that write to overlapping memory addresses. As noted above with reference to FIG. 2, the data associated with store instructions targeting overlapping addresses is merged by multiplexer 66 in response to control signals generated by execution control unit 50.

Referring again to FIG. 3B, following the merger of ST A and AT B at block 126, the process passes to block 128, which illustrates performing the store operation indicated by the merged store instruction. Thus, as depicted in FIG. 5, the merged data is written to memory during cycles 5 and 6. Thereafter, the process depicted in FIG. 3B terminates at block 130.

As will be appreciated from the foregoing description, the described store gathering mechanism improves processor performance by selectively combining store instructions. Although a method of store gathering has been described with reference to an exemplary store gathering operation in which two single-precision stores were gathered, it will be appreciated from the foregoing description that both single and double-precision stores can be gathered utilizing the illustrative embodiment hereinbefore described. Furthermore, it will be appreciated that store gathering provides maximum enhancement of processor performance for write-through and cache-inhibited store instructions due to the decrease in system bus latency. For example, if two non-gathered store instructions entail bus accesses of 7 cycles each, performing the two stores requires 14 cycles. In contrast, if the store instructions are gathered, only one seven cycle bus access is required, thereby substantially reducing the bus latency incurred.

While an illustrative embodiment has been particularly shown and described, it will be understood by those skilled in the art that various changes in form and detail may be made therein without departing from the spirit and scope of the illustrative embodiment.

What is claimed is:

1. A method of store gathering within a processor having a cache memory associated therewith, said processor further coupled to a bus, said method comprising:

identifying first and second store instructions that target one or more locations in said cache memory;

determining if performing an operation indicated by said first store instruction entails communication via said bus;

determining whether said cache memory is busy;

in response to a determination that performing said operation indicated by said first store instruction entails communication via said bus, merging said first and second store instructions into a single store operation regardless of whether said cache memory is busy;

in response to a determination that performing said operation indicated by said first store instruction does not entail communication via said bus and a determination that said cache memory is busy, merging said first and second store instructions into a single store operation; and thereafter, performing said single operation.

2. The method of claim 1, wherein said second instruction immediately follows said first instruction in a sequential order.

3. The method of claim 1, and further comprising the step of determining whether to merge said first and said second store instructions in response to a determination of whether all of said one or more locations in said cache memory can be written by said single store operation.

4. The method of claim 1, wherein at least one location among said one or more locations is targeted by both said first and said second store instructions.

5. The method of claim 1, wherein said step of merging said first and said second store instructions into said single store operation comprises:

determining a target address for said single store operation from an address specified by at least one of said first and said second store instructions; and determining data associated with said single store operation by combining data associated with said first and said second store instructions according to a sequential order of said first and said second store instructions.

6. The method of claim 1, said method further comprising:

disabling said cache memory prior to said single store operation; and enabling said cache memory only once for said single store operation.

7. The method of claim 1, wherein said first and said second store instructions are each associated with single-precision data targeted at adjacent address ranges in said cache memory, and wherein said single store operation is associated with double-precision data.

8. a processor having a cache memory associated therewith, said processor comprising:

a bus interface unit coupling the processor to a bus;

execution control logic for identifying first and second store instructions that target one or more locations in said cache memory;

merging logic coupled to said execution control logic, wherein said merging logic merges said first and said second store instructions into a single store operation in response to a determination that said cache memory is busy and a determination that performing an operation indicated by said first store instruction does not entail communication via said bus;

said merging logic merges said first and second store instructions into a single store operation regardless of whether said cache memory is busy in response to a determination that performing said operation indicated by said first store instruction entails communication via said bus; and memory access logic coupled to said merging logic, wherein said memory access logic perform said single store operation.

9. The processor of claim 8, said execution control logic further including logic for determining whether said one or more locations in said cache memory can be written by said single store operation.

10. The processor of claim 8, wherein said merging logic comprises:

address selection logic, wherein said address selection logic selects a target address for said single store operation from addresses of at least one of said first and said second store instructions; and data combination logic, wherein said data combination logic combines data associated with said first and said second store instructions according to a sequential order of said first and said second store instructions.

11. The processor of claim 8, wherein said memory access logic comprises a memory management unit that manages storage of data to said cache memory.

12. The processor of claim 11, said memory management unit including cache enabling logic, wherein said cache enabling logic disables said cache memory prior to said single store operation and enables said cache memory only once for said single store operation.

13. The processor of claim 8, and further comprising:

a first queue having at least one entry, said first queue being coupled to an input of said merging logic, wherein said at least one entry of said first queue temporarily stores said second store instruction; and a second queue having at least one entry, said second queue being coupled to an output of said merging logic, wherein said at least one entry of said second queue temporarily stores said first store instruction prior to said merger of said first and said second store instructions.

14. The processor of claim 13, wherein said at least one entry of said second queue temporarily stores said single store operation following said merger of said first and said second store instructions.

15. The processor of claim 8, wherein said first and said second store instructions are each associated with single-precision data targeted at adjacent address ranges in said memory, and wherein said at least one entry of said second queue includes a data field for temporarily storing double-precision data associated with said single store operation.

16. The processor of claim 8, wherein at least one location among said one or more locations is targeted by both said first and said second store instructions.

17. A data processing system comprising:

a cache memory;

a bus;

a processor coupled to said cache memory and said bus, said processor including:

execution control logic for identifying first and second store instructions that target one or more locations in said cache memory;

merging logic coupled to said execution control logic, wherein said merging logic merges said first and said second store instructions into a single store operation in response to a determination that said cache memory is busy and a determination that performing an operation indicated by said first store instruction does not entail communication via said bus;

said merging logic merges said first and second store instructions into a single store operation regardless of whether said cache memory is busy in response to a determination that performing said operation indicated by said first store instruction entails communication via said bus; and memory access logic coupled to said merging logic, wherein said memory access logic perform said single store operation.

18. The data processing system of claim 17, said execution control logic further including logic for determining whether said one or more locations in said cache memory can be written by said single store operation.

19. The data processing system of claim 17, wherein said merging logic comprises:

address selection logic, wherein said address selection logic selects a target address for said single store operation from addresses of at least one of said first and said second store instructions; and data combination logic, wherein said data combination logic combines data associated with said first and said second store instructions according to a sequential order of said first and said second store instructions.

20. The data processing system of claim 17, wherein said memory access logic comprises a memory management unit that manages storage of data to said cache memory.

21. The data processing system of claim 20, said memory management unit including cache enabling logic, wherein said cache enabling logic disables said cache memory prior to said single store operation and enables said cache memory only once for said single store operation.

22. The data processing system of claim 17, and further comprising:
- a first queue having at least one entry, said first queue being coupled to an input of said merging logic, wherein said at least one entry of said first queue temporarily stores said second store instruction; and
- a second queue having at least one entry, said second queue being coupled to an output of said merging logic, wherein said at least one entry of said second queue temporarily stores said first store instruction prior to said merger of said first and said second store instructions.

23. The data processing system of claim 22, wherein said at least one entry of said second queue temporarily stores said single store operation following said merger of said first and said second store instructions.

24. The data processing system of claim 23, wherein said first and said second store instructions are each associated with single-precision data targeted at adjacent address ranges in said cache memory, and wherein said at least one entry of said second queue includes a data field for temporarily storing double-precision data associated with said single store operation.

25. The data processing system of claim 17, wherein at least one location among said one or more locations is targeted by both said first and said second store instructions.

* * * * *